United States Patent [19]

Johnson et al.

[11] Patent Number: 5,149,945
[45] Date of Patent: Sep. 22, 1992

[54] METHOD AND COUPLER FOR INTERFACING A PORTABLE DATA CARRIER WITH A HOST PROCESSOR

[75] Inventors: Jerry W. Johnson, Likesade; John M. Taskett, Plano, both of Tex.

[73] Assignee: Micro Card Technologies, Inc., Dallas, Tex.

[21] Appl. No.: 548,414

[22] Filed: Jul. 5, 1990

[51] Int. Cl.⁵ .............................................. G06K 5/00
[52] U.S. Cl. ................................... 235/380; 235/379; 235/492; 902/4
[58] Field of Search ............... 235/379, 492, 437, 380; 902/4; 371/34

[56] References Cited

U.S. PATENT DOCUMENTS

| | | | |
|---|---|---|---|
| 3,971,916 | 7/1976 | Moreno | 902/4 |
| 4,070,648 | 1/1978 | Mergenthaler | 391/34 |
| 4,256,955 | 3/1981 | Giraud | 235/492 |
| 4,639,889 | 1/1987 | Matsumoto | 235/379 |

Primary Examiner—Harold Pitts
Attorney, Agent, or Firm—Kerkam, Stowell, Kondracki & Clarke

[57] ABSTRACT

This invention relates to a coupler which allows a host processor such as, for example, a personal computer or point of sale device or the like to communicate with and control a portable data carrier. A portable data carrier is a portable device which contains integrated circuit(s). Examples of portable data carriers are Integrated Circuit Cards, data keys, super smart cards, and smart coins. The coupler is adapted to receive the card in a standard card receptacle or card reader to establish connection between the card and a connector in the coupler to which the necessary control signals are applied. The presence of an integrated circuit card is detected in the coupler's card connector terminal which provides a card present signal to the host processor. The host, in turn, provides Clear-To-Send (CTS), Request-To-Send (RTS), Data-Set-Ready (DSR) and Data-Terminal-Ready (DTR) signals. The input/output data from the input/output line channel of the IC card is connected to the Transmit-Data (TX) and Receive-Data (RX) lines of the host processor without the necessity of retransmitting characters communicated between the portable IC and on data carrier and the host processor.

23 Claims, 5 Drawing Sheets

METHOD AND COUPLER FOR INTERFACING A PORTABLE DATA CARRIER WITH A HOST PROCESSOR

BACKGROUND OF THE INVENTION

The invention relates to a method and coupler for serial communication between a hardware or software Universal Asynchronous Receiver Transmitter terminal (UART) such as, would be associated, for example, with a host processor, a personal computer, or point of sale device or the like and a portable data carrier.

Description of the Prior Art

Recent advances in the manufacture of integrated circuit chips have led to the development of a multipurpose plastic card having a microprocessor no bigger than a penny embedded therein known as a "smart card". Such cards and their method of manufacture and methods for transmitting signals between the cards and the host terminal are well known, as described, for example, in the following U.S. Pat. Nos.:

A portable data carrier is a portable device which contains integrated circuit(s). Examples of portable data carriers are Integrated Circuit Cards, data keys, smart cards, and smart coins.

| U.S. Pat. No. | Inventor | Title |
| --- | --- | --- |
| 4,211,919 | Ugon | Portable Data Carrier Including a Microprocessor |
| 4,216,577 | Badet et al. | Portable Standardized Card Adapted To Provide Access To A System For Processing Electrical Signals And A Method of Manufacturing Such a Card |
| 4,222,516 | Badet et al. | Standardized Information Card |
| 4,224,666 | Giraud | Data Processing System Which Protects the Secrecy of Confidential Data |
| 4,271,482 | Giraud | Data Processing System Which Protects the Secrecy of Confidential Data |
| 4,382,279 | Ugon | Single Chip Microprocessor With On-Chip Modifiable Memory |
| 4,556,958 | Ugon | Device For Single Line Bidirectional Data Transmission Between An Intelligent Card's Microprocessor and a Second Processor |
| 4,638,120 | Herve | Method and System For Transmission of Confidential Data |

Because of the built computer logic and memory, the so called "smart card" has found use in a variety of applications. The "smart card" can be used for encoding confidential data, as an electronic security key for protecting information and property, a portable file for monitoring medical or insurance records, payroll records, funds transfers and inventory controls, to name a few.

Despite the popularity of portable data carriers containing integrated circuits such as, for example, the so-called "smart cards", heretofore it has been thought necessary when coupling such devices serially to a host terminal that the coupler or smart card reader must contain a microprocessor and that "bit banging" of the input and output signals was the only way to process the input and output. In such arrangements, the microprocessor in addition to processing the input/output signals is also responsible for developing the major control and interface signals to enable communication.

Couplers for Integrated Circuit Cards are available today from a number of vendors including Micro Card Technologies, Inc., of Dallas, Tex. These couplers interface to host processors or terminals, simply referred to as hosts, using a number of different serial I/O channels and communication protocols. Commands from the host are transmitted to the coupler over the serial I/O channel as a series of bytes. Handshake lines of the serial I/O channel are sometimes used by the host, but only to control the flow of commands to the coupler, not to control the coupler/card interface. The presence of an Integrated Circuit Card in the coupler is sometimes reported to the host using a serial I/O channel handshake line.

All couplers available today contain a processor, such as an 8051, which controls the card interface and accepts commands from the host. Because the microprocessor receives characters from the host processor and retransmits them to the Integrated Circuit Card, a performance penalty is imposed. A major penalty or disadvantage of such couplers is that the microprocessor in the coupler interface slows down the process of interfacing the smart card to the host terminal. This is due to the fact that for transmissions from the host terminal, the microprocessor has to "listen" for a command from the host terminal and then interpret and reformat the command before sending it to the smart card. The same would be true when the smart card transmits a message to the host terminal. The microprocessor has to receive the message, reformat the message and then transit the reformatted message directly. A system which can avoid the use of a microprocessor would process information two-to-three times faster.

Another disadvantage of known systems is the cost resulting from the necessity of incorporating a microprocessor in the coupler. A system which avoids the use of a microprocessor would provide a substantial cost benefit.

SUMMARY OF THE INVENTION

Accordingly, it is a primary object of the present invention to provide a coupler as an interface between a portable data carrier and a host information processing terminal which avoids the use of a microprocessor.

Another object of the present invention is to provide a coupler as an interface between a portable data carrier and host processor including a means of communicating with the portable data carrier over a serial I/O communications channel without the coupler receiving and retransmitting characters communicated between the portable data carrier and the host processor.

A further object of the present invention is to provide a coupler as an interface between a portable data carrier and host processor which controls portable data carrier interface signals using handshake lines of a serial I/O communications channel.

Yet another object of the present invention is to provide a coupler as an interface between a portable data carrier and a host processor wherein said coupler is powered with electrical power parasitically derived from a serial I/O communications channel.

Still another object of the present invention is to provide a coupler as an interface between a portable data carrier and a host processor which includes a means of enabling required electrical signals when the portable data carrier's presence is detected.

A further object of the present invention is to provide a coupler as an interface between a portable data carrier and a host processor which provides sequences of electrical signals such as RESET signals when a portable data carrier's presence is detected.

Another object of the present invention is to provide a coupler as an interface between a portable data carrier and a host processor in which received and transmitted data from the host processor is connected with data transmitted by the portable data carrier to allow detection of error signals generated by the portable data carrier.

Still another object of the present invention is to provide a coupler as an interface between a portable data carrier and a host processor which includes a means of connecting received data from the host and data transmitted from the host processor with data transmitted by the portable data carrier to allow the host processor to receive its own transmissions and detect errors in communication.

A further object of the present invention is to provide a coupler as an interface between a portable data carrier and a host processor which includes a connecting means which replaces the conventional interface driver and receiver integrated circuit(s) of a host processor communications device.

A still further object of the present invention is to provide a device for interfacing one or more portable data carriers by which the communications of each portable data carrier and a local or host processor are combined with the communications of each other portable data carrier or local or remote processor, such transmissions being receivable by the other portable data carriers and local or host processors, if any.

Yet another object of the present invention is to provide a low cost solid state coupler as an interface between a portable data carrier and a host processor which avoids the use of a microprocessor in the coupler and retransmission of characters communicated between the portable data carrier and the host processor.

In accordance with a preferred embodiment of the present invention, the coupler is connected to a host processor via an EIA-232/V.28 serial I/O channel which provides Clear-To-Send (CTS), Request-To-Send (RTS), Data-Set-Ready (DSR) and Data-Terminal-Ready (DTR) signals as well as Transmit-Data (TX) and Receive-Data (RX). The host will include a universal asynchronous receiver transmitter (UART) which may be hardware or software and is assumed to be a Data Terminal Equipment (DTE) device, while the coupler acts as a Data-Communications-Equipment (DCE) device. Other forms of serial link such as RS-422 and Integrated Services Digital Network (ISDN) protocols can also be used.

In accordance with a preferred embodiment of the invention, a coupler for interfacing a portable data carrier with a host processor comprises first terminal means (U4-23) adapted to receive data from the host processor, input/output terminal means (J4-9) adapted to receive input data from the data carrier and the data received at the first terminal means from the host processor, secodn terminal means (U4-19) connected to said input/output terminal means to enable the input data from said data carrier to be translated to the host processor and control means (83) connected between said first and said second terminal means and said input/output terminal means for translating input data from said first terminal means to said second terminal means and to the input/output terminal means.

In accordance with this embodiment, input data is looped back between the first and the second terminal means and the control means (83) comprises switching means for switching data to the second terminal means and the input/output terminal means.

Card connector means may be provided for receiving the portable data carrier along with means for controlling its switching means for applying a bias voltage to said control means in response to insertion of said data carrier into said connector means.

In a further variation of the system, means are provided for receiving data from the host processor and translating said data to the input/output terminal means adapted to be connected to said data carrier and simultaneously echoing the data received to the host processor.

The system further includes means for connecting data from the portable data carrier to the input/output data terminal means and means responsive to the connection of said data carrier to the input/output terminal means for generating control signals to enable translation of data from the data carrier to the host processor and data from the host processor to the data carrier. Feedback means assures echoing the data received from the host processor back to the host processor to allow said host processor to receive its own transmission.

The invention also relates to a method for interfacing a portable data carrier with a host processor via a signal coupler comprising the steps of generating a carrier present signal CRD PRS and a clear to send signal CTS upon insertion of a portable data carrier in a connector adapted to receive said carrier; generating a CRD ON signal in response to a request to send signal from said host processor after receipt by the host processor of a clear to send signal; generating a card voltage signal CRD VCC to be applied to the portable data carrier in response to said CRD ON signal and transmitting and receiving data between said host processor and portable data carrier, said step of transmitting and receiving data including the step of echoing data from the host processor to allow said host processor to receive its own transmission for detecting errors in communication.

A further variation of the method further includes generating a clock signal CRD CLK in the coupler and applying the clock signal to the data carrier.

According to the inventive method, the received and transmitted characters of the data to detect multiple bit errors are compared and retransmission of characters transmitted by the data carrier is ordered upon detection of an error.

The coupler provides a means of coupling the TX and RX lines to the I/O line of the Integrated Circuit Card. Feedback means may be provided between the TX and RX lines to be used for error detection. In full duplex Integrated Circuit Cards, the TX and RX lines are connected to the corresponding Integrated Circuit Card contacts of the Integrated Circuit Cards. Of course, contactless interfaces are also possible.

In accordance with the present invention, circuit means is provided which detects the presence of an Integrated Circuit Card in the coupler's card connector. A further circuit means is provided to couple this signal to the card present CTS line of the EIA-232/V.28 link to provide card present CTS signals to the host indicating that a card is present in the coupler. The host commands the coupler to raise or lower the card's RESET line by asserting or clearing the DTR signal, while the coupler provides means for controlling the RESET line in response to the state of the DTR signals. The RESET line is qualified with CARD VCC.

The RTS signal is used by the host observer to request the CARD VCC be raised or lowered. The Coupler provides a means of controlling CARD VCC in response to the RTS signal. In addition, the coupler may qualify this signal with the presence of a card in the connector. The coupler further provides a means of enabling a clock signal to the CARD CLK contact of the Integrated Circuit Card when RTS is active. The coupler further provides a means of enabling CARD VPP when RTS is active. Thus RTS controls CARD VCC, CARD VPP and CARD CLK.

The coupler can provide a means of controlling DSR to reflect the status of coupler power. This is used as a diagnostic tool to detect the presence of a working coupler.

CARD CLK, CARD VCC, and CARD VPP can be controlled independently using additional handshake lines. In addition, the coupler can include a means of providing a suitable RESET pulse when RTS requests that CARD VCC be raised to a card.

Further, the CARD VCC, CARD CLK and CARD RESET may all be provided by the coupler when a card is inserted. This embodiment has particular application in access control applications where the coupler communicates with a host processor via a current loop interface. In this case no handshake lines need to be run to the access control portal. The presence of a card is signaled to the host processor by the card's Answer-To-Reset.

Power to the coupler can be provided by an external supply, a battery, a connection in common to the EIA-232/V.28 channel, or by parasitically removing power from the EIA-232/V.28 channel. The latter has the advantage of simplicity and low cost but restricts the coupler to low power Integrated Circuit Cards. Other types of serial I/O channels can also be tapped for power.

Power and the required EIA-232/V.28 signals can be provided to the coupler if a cable which connects the coupler to the host processor is terminated such that it connects directly to a socket (or sockets) which normally house the EIA-232/V.28 driver and receiver integrated circuit(s). In this case the signal levels are typically TTL, not EIA-232/V.28 and power is directly available. This provides a very low cost option as it reduces the circuitry in both the host and coupler for level conversion, and alleviates the need for a special power supply. This is the preferred approach for couplers which are added within the housing of an existing host processor, such as within the disk drive bay of a PC.

ISO has standardized a communication protocol for integrated circuit cards which uses a unique byte retransmission request bit (UGON++++). A retransmission bit is sent by the receiver of a character when the character has been received in error. The transmitter then retransmits the erroneous character. The protocol is designed to be incompatible with a standard Universal Asynchronous Receiver Transmitter as is used on most asynchronous I/O channels today. The retransmission bit must be transmitted during what is normally the stop bit of the transmitted character. A normal Universal Asynchronous Receiver Transmitter (UART) may see this as a start bit, but would not report it to the host until a full 12 Elementary Time Units (ETUs) of character time has elapsed. The transmitter may well be into the transmission of a new character before the error report is detected, resulting in a communications collision.

In accordance with a particular object and advantageous feature of the present invention, there is provided feedback within the coupler between the TX and RX EIA-232/V.28 lines. This allows the host to receive it's own transmissions. If the card signals that a retransmission is requested, then the UART reports a framing error as the retransmission bit is within the normal stop bit of the character is question. In addition, if a double bit error is produced on the line and the Integrated Circuit card does not detect the error the host can still detect the error by comparing the received and transmitted characters. This provides a robust means of error detection for the host. In the case of errors in characters transmitted by the card, the host can detect these using the parity bit, and once an error has been detected in a transmission the entire command can be repeated to ensure valid data. Once a transmission protocol which includes block error detecting codes, error detection and correction becomes more conventional with retransmission at the block level.

Multiple cards can be connected together to share a single serial I/O channel. In this case, each card can receive the transmissions of any other cards on the channel as well as any host processor(s) or local processor(s) on the channel (if any). A host processor (or processors) or local processor (or processors) on the channel can receive the transmissions of any cards or other processors on the channel. Collisions on the communications channel are resolved by an appropriate Integrated Circuit Card communications protocol, or additional handshake lines.

BRIEF DESCRIPTION OF THE DRAWINGS

These and other objects and advantages of the invention will become readily apparent to those skilled in the art from the detailed description of the preferred embodiments to be considered in connection with the following drawings, wherein like reference characters represent like parts throughout the several views.

DESCRIPTION OF THE PREFERRED EMBODIMENT

Figure 1:
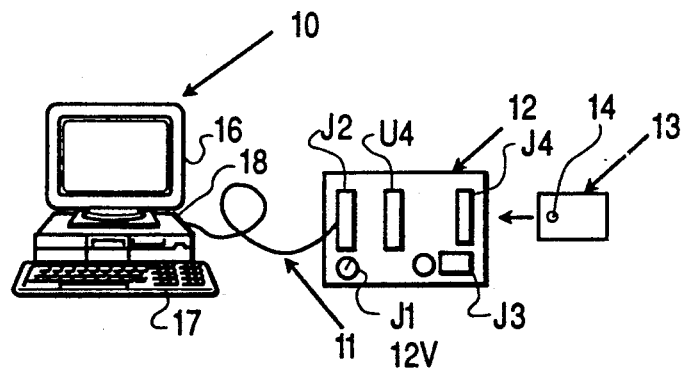
FIG. 1 shows a typical system configuration of the present invention in block diagram form.

FIG. 1 shows a typical system configuration with a personal computer acting as a host processor, 10, an EIA-232/V.28 serial communication line comprising an RS 232 cable 111 acting as a serial I/O channel, coupler 12, and an Integrated Circuit Card, (ICC) 13, acting as the portable data carrier. ICC 13 is a plastic card containing a micro processor 14 positioned on the card in accordance with ISO nomenclature specification 7816. ICC 13 includes contacts C1-C8 each of which is reserved in accordance with ISO 7816 standard for a particular signal. For example, card contact Cl receives a 5Vdc card VCC voltage (CRD VCC), contact C2 receives the card reset signal (CRD RST), contact C3 receives the card clock signal (CRD CLK). Card input and output data are received and sent via card contact C7. Contacts C1-C8 are connected within the coupler to contact terminals of a card connector J4. Card Connector J4 includes a switch 15 (shown in FIG. 6) conveniently positioned to be actuated to a closed position upon insertion of the card so as to provide a card present (CRD PRS) signal to the host processor 10. Communication with the host processor is maintained via a RS 232 serial communication line 11 connected to the host processor 10 which may be any type of terminal adapted for serial communication and usually containing a UART which may be either hardware or software. As shown in FIG. 1, host 10 may be a personal computer including a display 16, data input keyboard 17 and processor 18.

Figure 2:
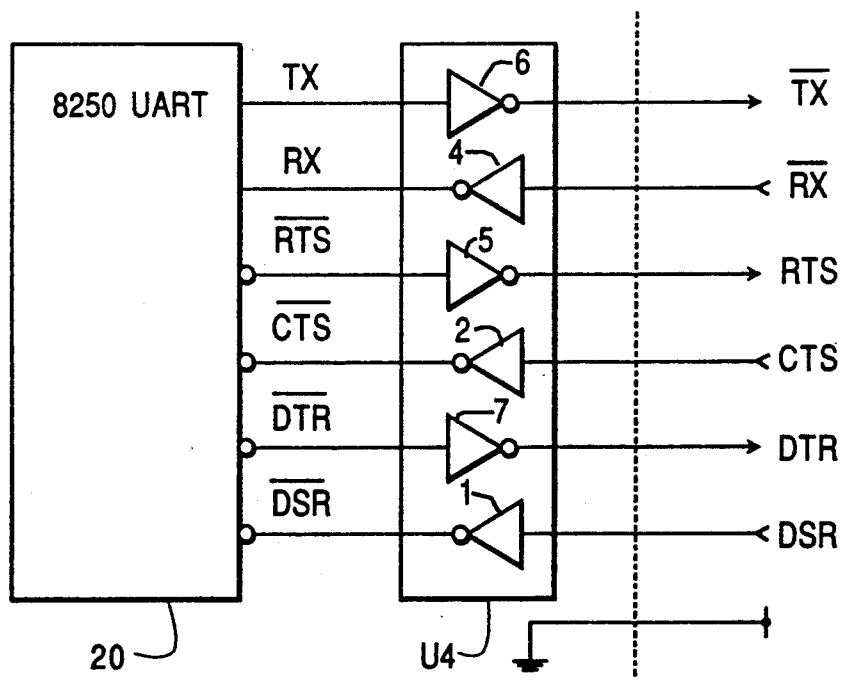
FIG. 2 shows a typical UART configuration within a host processor for serial I/O communications with EIA-232/V.28 level conversion.

FIG. 2 shows a typical (UART) 20 configuration within host processor 10. The 8250 UART is common in many personal computers and is the UART which corresponds to the software listings included in the 8250 Universal Asynchronous Receiver Transmitter. The UART 20 provides and receives typical serial I/O communications channel signals, including a transmit data to card signal TX, a receive data from card signal RX, a card present signal CTS, an enable card VCC and CLK signal RTS, a reset card signal DTR and a coupler power OK signal DSR. The latter signal is optional. The sense of the control signals are as follows:

| Card Present | CTS = 0 |
| V_cc ON | RTS = 0 |
| Card Reset | DTR = 1 |
| Coupler Active | DSR = 0 |

The signals at the UART are at RS 232 levels and converted through integrated circuit board U4 to TTL levels. Circuit board U4 may be a MAX 236 available from Maximum Semiconductor and includes a plurality of invertors connected as shown to ensure the proper sense and line of the signals as shown in FIG. 2.

Figure 3:
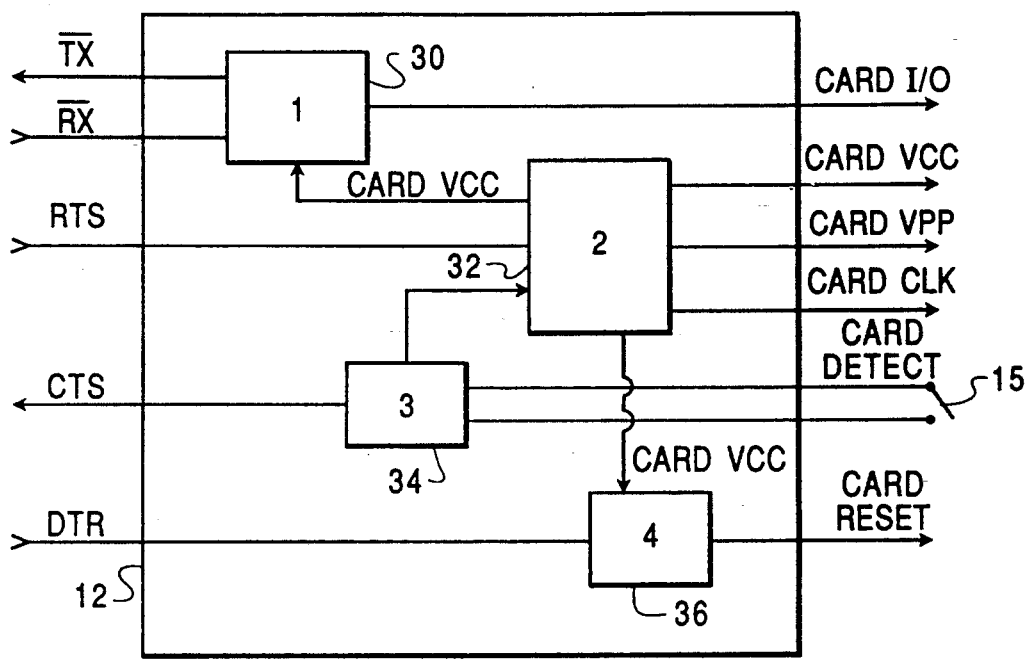
FIG. 3 shows a block diagram of the coupler in accordance with the present invention.

FIG. 3 shows a simplified block diagram of the coupler 12. Signals entering and leaving the coupler from the left, as viewed in FIG. 3, correspond to the signals in FIG. 2. Signals entering and leaving the coupler 12 on the right, as viewed in FIG. 3, correspond to connections to the Integrated Circuit Card 13 and a card detection switch 15. Circuit means 30 are provided for coupling TX and RX data signals from and to the host processor to CARD I/O.

A card VCC signal is derived from circuit means 32 which also provides means for enabling a VPP signal and generating and enabling a card clock CARD CLK signal under control of the host processor. The circuit represented by block 34 provides means for reporting the presence of a card 13 upon closure of the card detect switch 15 and generating a card present signal CRD PRS applied to the CTS line and circuit 32. Circuit means 36 generates a card reset CRD RST signal in response to a data terminal ready signal DTR and card VCC.

Figure 4:
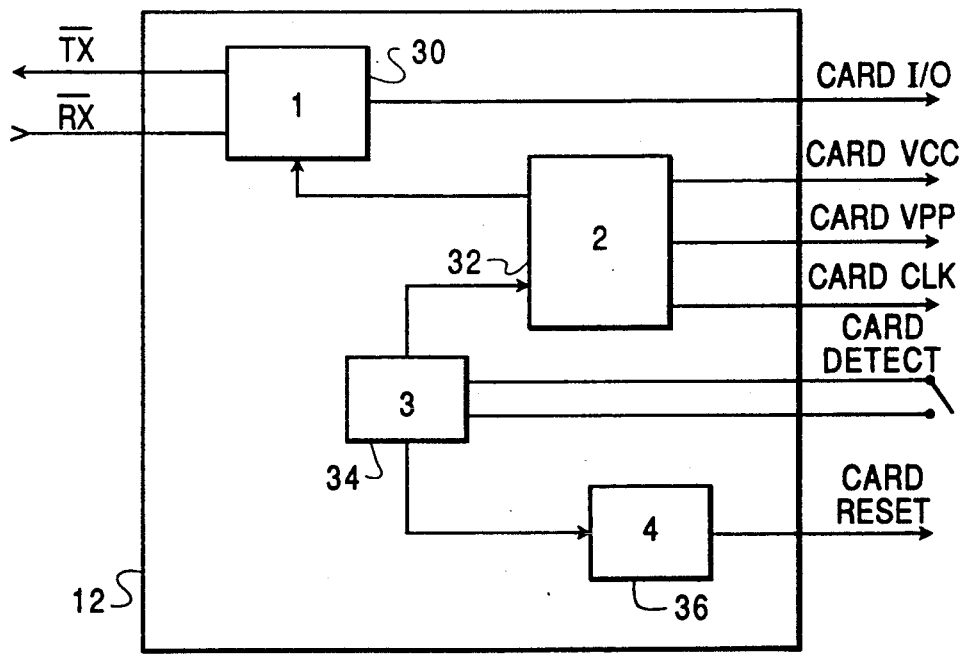
FIG. 4 shows a block diagram of the coupler in accordance with the present invention in the case where the card enables and CARD RESET pulse are generated in the coupler without host processor control.

FIG. 4 shows an alternate embodiment of the invention in the case where the card enable control and CARD RESET pulse are generated in the coupler 12 without host processor control. Circuit means 30 combines the host processor TX and RX signals with the CARD I/O signal. It is enabled by circuit means 32 which as hereinabove described provides a means of enabling the CARD VCC, CARD VPP, and generating and enabling CARD CLK signals. Circuit 32 is enabled by circuit 34 which responds to the presence of a card and enables circuits 32 and 36. When a card is removed it powers down all card contacts and circuit 36 is arranged to produce a low CARD RESET pulse for a controlled period of time, then presenting a high CARD RESET state until the card is removed.

Figure 5:
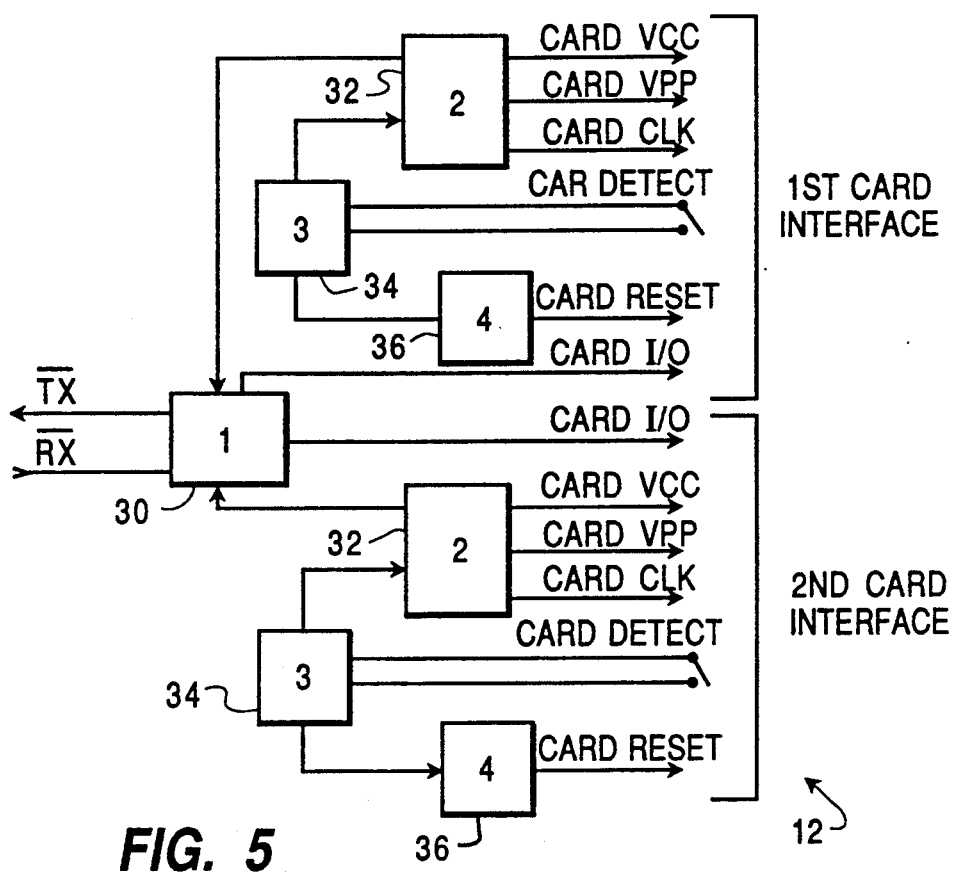
FIG. 5 shows a block diagram of the coupler in accordance with the present invention in the case where there are two Integrated Circuit Card Interfaces on the one coupler.

Referring to FIG. 5, there is shown a block diagram of the coupler 12 in the case where there are a first and a second Integrated Circuit Card Interfaces on one coupler. In this case, the combining means 30 combines the RX and TX signals from the host processor with the I/O lines of both CARD I/O signals. In this case, each card receives the transmissions of the other card and the host processor, and the host processor receives the transmissions of both cards (assuming they are both present).

Figure 6:
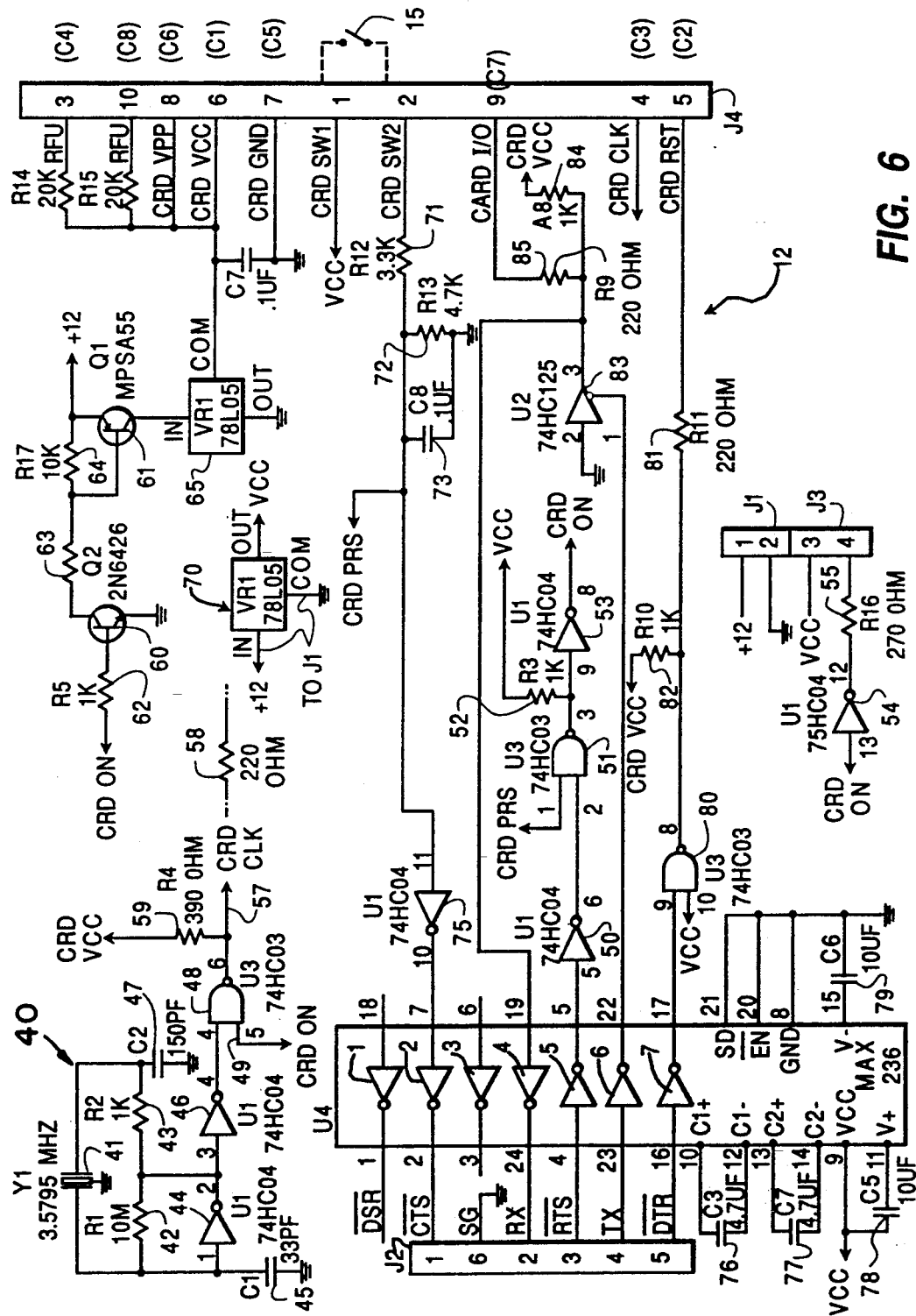
FIG. 6 is a schematic diagram of the coupler in accordance with the present invention.

Referring to FIG. 6, there is illustrated a detailed schematic of the present invention. The card clock signal CRD CLK is developed by oscillator 40, comprising a Y1-3.5795 Mhz crystal 41, which is connected across resistors 42 and 43. One end of resistor 42 is connected to pin I of invertor 44. The one end of resistor 42 has also connected thereto one end of capacitor 45, the other end of which is connected to ground. The junction of resistors 42 and 43 is connected between the output pin 2 of invertor 44 and the input pin 3 of invertor 46. The other end of resistor 43 is connected to one end of capacitor 47, the other end of which is connected to ground. Crystal 41, resistors 42, 43, capacitors 45 and 46 and invertor 41, and pins 1 and 2 of invertor 44 form a free running Pierce crystal oscillator circuit which develops a clock signal at the output. The output which is taken from pin 2 of invertor 44 is applied to pin 3 of invertor 46 where the clock signal is buffered. The output of invertor 46 taken at pin 4 thereof is applied to one input of Nand gate 48. The other input of Nand gate 48 receives the CRD ON gate signal when a request to send signal RTS is applied to pin 4 of J2 and the associated invertor J2-5.

The request to send signal RTS which is applied to pin 4 of U4 is converted to a TTL level and its output taken from pin 5 of U4 and applied to pin 5 of invertor 50. The output of invertor 50 taken at pin 6 thereof is applied to one input of Nand gate 51. If pin 2 of Nand gate 51 to which the signal is applied is at a 5 volt DC level and pin 1 has applied thereto a card present CRD PRS signal at a 5 volt DC level, then pin 3 of Nand gate 51 will go to ground. A smart card must be inserted in the connector and switch 15 closed before a CRD PRS signal will be available on pin 1 of gate 51 at a 5 vdc level. Because Nand gate 51 is an open drain device, a pull up resistor 52 is connected from the output line of gate 51 to VCC. The output of Nand gate 51 is connected to pin 9 of invertor 53, the output of which taken at pin 8 thereof provides the CRD ON signal.

The CRD ON signal does three things. It is applied to the powered up visual indicator circuit. To this end, CRD ON is applied to pin 13 of invertor 54. Output pin 12 of invertor 54 is connected through current limiting resistor 55 to pin 4 of connector J3. Pin 4 has connected thereto a light emitting diode LED which is returned to VCC via pin 3 of connector J3. Upon insertion of a card into the card connector and consequent closure of switch 15, light emitting diode connected between resistor 55 and VCC provides a visual indication that CRD ON is at a 5 dc level. This provides the user with a visual indication that the smart card is powered up. Secondly, the CRD ON signal is applied to pin 5 of Nand gate 48. This switches the gate ON to provide a card clock output signal CRD CLK at line 57. The card clock is applied via series load current limiting resistor 58 to limit the current in case of short circuit. Because Nand gate 48 is an open drain device, a pull up resistor 59 is connected between output pin 6 of Nand gate 48 and CRD VCC so that the pull up is only active when CRD VCC is at a 5 vdc level. The third function of the CRD ON signal outputted from invertor 53 is to generate a CRD VCC signal. This is to be distinguished from the VCC voltage developed by regulator 70.

To this end, the CRD ON signal is applied to the CRD VCC circuit comprising transistors 60 and 61, resistors 62, 63 and 64, and voltage regulator 65 CRD resistor 62 has one end connected to the base of transistor 60 and its other end adapted to receive the CRD ON signal. The collector of transistor 60 is connected via resistors 63 and 64 to the emitter of transistor 61. The junction of resistors 63 and 64 is returned to the base of transistor 61 and its collector is connected to the input of voltage regulator 65, which provides a 5 volt dc regulated output CRD VCC signal applied to pin 6 of J4 and the C1 contact of the integrated circuit card.

When CRD ON is at ground level, transistor 60 is in its cut off state and the base of transistor 61 is pulled to plus 12 volts dc through resistor 64 connected to a twelve volt source. This puts transistor 61 in cut off, and nothing occurs. When a CRD ON signal at a 5 volt dc level is applied to the base electrode of transistor 60, base current therein is limited and transistor 60 is put in conduction. In turn, the base of transistor 61 is pulled to ground through series resistor 63 and transistor 61 switched into conduction. A 12 volt dc signal appears on the collector of transistor 61 and is applied to the input of voltage regulator 65. Voltage regulator 65 regulates the 12 volt dc supply to plus 5 volts dc to establish the CRD VCC signal. This voltage is applied to the smart card and several pull up resistors as hereinbefore described.

Power to the circuits is supplied through voltage regulator 70 which takes a voltage input from 7 volts dc to 30 volts dc and regulates it to a 5 volt dc. The input voltage to regulator 70 may be applied via an external plug in jack J1. The VCC source 70 supplies power to other circuits in the coupler but not to the smart card. To this end, VCC is applied to one contact of card on switch 15, the other contact of which is connected to the RC circuit comprising resistors 71 and 72 and capacitor 73. Capacitor 73 is connected at one end to the junction of resistors 71 and 72 and at its other end to the grounded end of resistor 72. When switch 15 is closed, due to the presence of a card in the connector, the junction point 74 provides a card presence signal CRD PRS which is applied to Nand gate 51 and to pin 11 of invertor 75. Output pin 10 of invertor 75 is connected to pin 7 of U4 where it is converted to an RS 232 level as the clear to send signal CTS. CTS is taken from pin 2 of U4 and connected to the host via the RS 232 cable. When the smart card is withdrawn from the card connector, the CRD PRS line is pulled to ground by resistor 72.

U4 and capacitors 76, 77, 78 and 79 form an RS 2321 TTL voltage level shifter. This level shifter includes 4 invertors 1, 2, 3 and 4 which convert TTL levels at terminals 18, 7, 6 and 19 of U4 to RS 232 levels at terminals 1, 2, 3 and 24 of U4. Terminal 2 connects the clear to send signal CTS to the host and terminal 24 applies the receive data signals RS to the host converted to the RS 232 levels through U4 Shifter. U4 also includes 3 invertors 5, 6 and 7 which convert RS 232 signals from the host to TTL levels used in the coupler. The request to send level RTS is applied to pin 4 of U4 and its corresponding TTL level output taken at pin 5 is applied to input pin 5 of invertor 50.

A request to send signal RTS from the host computer is applied to pin 4 of U4 and converted to a TTL level. The signal is taken at pin 5 U4 and applied to pin 5 of invertor 50. The output of invertor 50 taken from pin 6 thereof is applied to one input of Nand gate 51, the other input of which receives a card present CRD PRS signal, If pin 2 of Nand gate 51 is at a 5 volt dc level and pin 1 receives a CRD PRS signal at a 5 volt dc level, then the output of Nand gate 51 will go to ground. A smart card must be inserted in the connector before a CRD PRS signal is available.

A data terminal ready signal DTR from the host computer is applied to pin 16 of U4 and is converted to TTL level. This signal taken at pin 17 of U4 is applied to pin 9 of Nand gate 80. The other input of Nand gate 80 receives a VCC signal. Upon the presence of a DTR signal, pin 9 is at 5 volts dc level and the output at pin 8 is maintained at ground through resistor 81 connected to terminal 5 of connector J4. Terminal 5 is in turn connected to contact C2 of the smart card. Resistor 81 serves to limit current in case of short circuit. When pin 9 of Nand gate 80 is at ground level, no output appears at pin 8 and the CRD RST line is pulled up by resistor 82 if the CRD VCC voltage is turned on.

Transmit data TX from the host computer is applied to pin 23 and converted to a TTL level. The signal taken at pin 22 of U4 is applied to pin 1 of tri-state driver 83 which has its input at pin 2 grounded and its output terminal at pin 3 connected to CRD VCC through resistor 84. When terminal 22 and pin 1 of driver 83 are low, i.e., at ground level, driver 83 is enabled, i.e., switched and outputs on low signal. When pin 1 of driver 83 is at 5 volts dc level, pin 3 is pulled up if CRD VCC is present and driver 83 acts as an open switch. The output of driver 83 is applied through series resistor 85 to the smart card input-output terminal 9 of connector J4 and contact C7 of the integrated circuit card. The output of driver 83 is also looped back to terminal 19 of U4 and converted to an RS 232 level for application to the host. This provides a loop back path so that any data transmitted into the coupler is echoed to the host computer receive data input. Smart card data and any data sent from the host computer are applied to pin 19 where it is converted to the RS 232 level and to the host computer receive data input.

Figure 7:
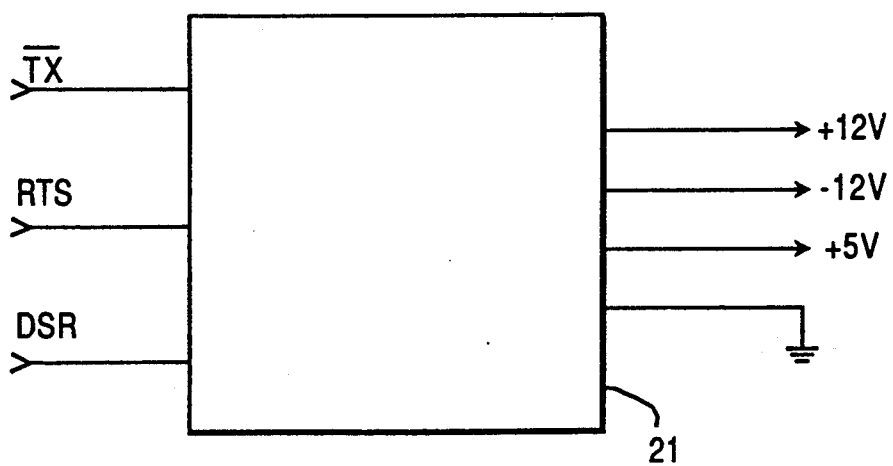
FIG. 7 shows a power supply for the coupler which in accordance with the present invention parasitically supplies +5 volts and ±12 volts (typical) for coupler operation from the EIA-232/V.28 input signals, without destroying the signal integrity of the TX signal.

FIG. 7 shows a power supply for the coupler 12 as a means of parasitically supplying +5 volts and ±12 volts for coupler operation from the EIA-232/V.28 input signals, without destroying the signal integrity of the TX signal. To this end, in addition to transmit data TX and a request to send signal RTS from the host, a coupler power signal DSR is applied to a voltage regulator 21 which provides ±12 vdc output for operation of the coupler.

Figure 9:
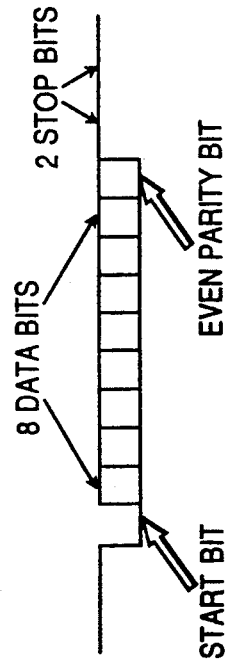
FIG. 9 shows a typical asynchronous character frame as used in the present invention.
Figure 8:
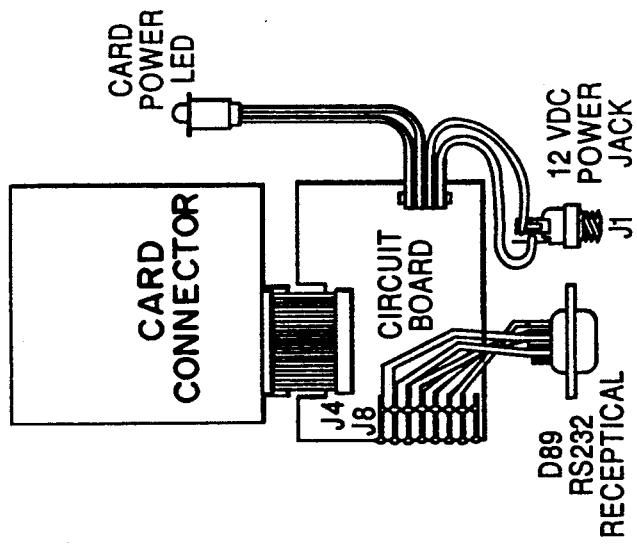
FIG. 8 shows a typical layout of the card connector circuit board and cable connectors for the present invention.

Referring now to FIG. 9, there is shown a typical asynchronous character frame on a line with eight data bits, an even parity bit and two stop bits. The line is normally in a MARK state, and the beginning of a character is signaled by the transition to a SPACE state for the start bit. Each bit occupies one Elementary Time Unit, or ETU. The total character occupies twelve ETUs, one for the start bit, eight for the data bits, one for the parity bit, and two for the stop bits.

Figure 10:
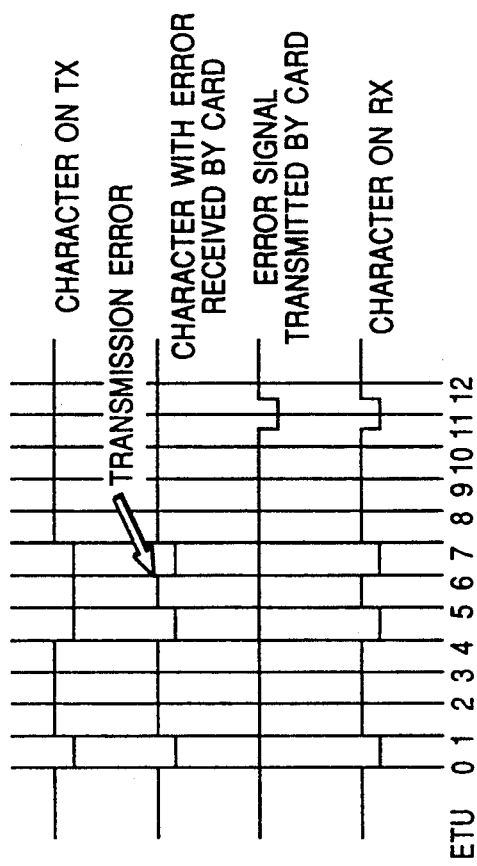
FIG. 10 is a timing diagram of a transmitted character illustrating how internally connecting the transmitted data from the host processor to the card I/O line and the received data line of the host processor is used to detect errors.

FIG. 10 shows by means of a timing diagram how internally connecting the transmitted data from the host processor to the card I/O line and the received data line of the host processor is used to detect errors. In the first timing diagram, at the topmost line of the figure, the host processor has transmitted a character to the coupler on the TX terminal. The second timing diagram or line shows the character after noise on the line has corrupted the character and inverted a bit. This is indicated as a transmission error identified by the arrow. This data is received by the portable card and tested for even parity. Due to the transmission error, the parity test fails and the card issues an error signal on the I/O line from 10.5 to 11.5 ETUs after the leading edge of the start bit as shown in the third timing diagram. The fourth timing diagram shows the character as received by the host processor. The host processor detects that the character may have been received in error by the card because the received character has bad parity, the received character does not match exactly the transmitted character, and the received character generates a FRAMING ERROR since it has a SPACE during the period of the two stop bits.

Upon insertion of a card into the card connector, a clear to send CTS signal is sent to the host which in turn generates a data terminal ready signal DTS that results in application of a reset CRD RST signal to the portable data card. Inasmuch as the input/output line of the data card, terminal 9 of J4 is pulled up to CRD VCC through resistors 84 and 85, a loopback test for communication errors can only be performed if there is a request to send (RTS) input signal applied to J4 and a card is present in the card connector or reader.

Reference should be made to Appendix, which forms part of this specification and which is incorporated herein for a clearer understanding of the routines and commands for communicating between the host and portable data card.

While the invention has been described in connection with certain preferred embodiments, it will be apparent to those skilled in the art that variations will suggest themselves without departing from the true scope and full spirit of the invention. Accordingly, it is intended by the appended claims to cover all such variations and resort should be made to the appended claims to determine the scope of the invention.

We claim:

1. A method for interfacing a portable data carrier with an asynchronous receiver transmitter for asynchronous data transmission via a signal coupler adapted to receive the portable data carrier in an associated connector comprising generating a carrier present signal CRD PRS and a clear to send signal CTS upon insertion of the portable data carrier in the connector adapted to receive said carrier; generating a request-to-send RTS signal from said asynchronous receiver transmitter after receipt by the asynchronous receiver transmitter of a clear to send CTS signal;

generating a card on CD ON signal in response to the request to send RTS signal from said receiver transmitter;

generating a card voltage signal CRD VCC to be applied to the portable data carrier in response to said CRD ON signal; and transmitting and receiving data between said receiver transmitter and portable data carrier in response to said generated signals and insertion of a data carrier into the connector, said step of transmitting and receiving data including the step of echoing data from the receiver transmitter to allow said receiver transmitter to receive its own transmission and detect errors in communication on a character by character basis and allow a character error to be acted upon prior to the transmission of the next character.

2. A method as set forth in claim 1 further including generating a clock signal CRD CLK in the coupler and applying the clock signal to the data carrier.

3. A method as set forth in claim 1, further including comparing the received and transmitted characters of the data to detect multiple bit errors.

4. A method as set forth in claim 1, further including ordering retransmission of characters transmitted by the data carrier upon detection of an error.

5. A method as set forth in claim 1, further including means for detecting a retransmission signal.

6. A coupler (12) for interfacing a portable data carrier (13) with an asynchronous receiver transmitter for asynchronous data transmission (10) comprising a first terminal means (U4-23) adapted to receive asynchronous data transmitted from the synchronous receiver transmitter, connector means adapted to receive a portable data carrier (10), input/output terminal means (J4-9) adapted to receive asynchronous input data from the data carrier (13) and the asynchronous data received at the first terminal means (U4-23) from the asynchronous receiver transmitter (10), second terminal means (U4-19) connected to said input/output terminal means to enable the input data from said data carrier to be translated to the asynchronous receiver transmitter and control means (83) connected between said first (U4-23) and said second (U4-19) terminal means and said input/output terminal means (J4-9) for translating input data from said first terminal means (U4-23) to said second terminal means (U4-19) and to the input/output terminal means (J4-9) and generating a framing error signal when a character of the asynchronous data received contains an error, said framing error signal being acted upon prior to the transmission of the next character.

7. A coupler as set forth in claim 6 further including means for parasitically supplying operating voltage levels for coupler operation from the data received from the receiver transmitter without destroying the signal integrity of the data received.

8. A coupler as set forth in claim 6 wherein said data received includes a transmit data signal TX, a request to send signal RTS and a coupler power signal.

9. A coupler as set forth in claim 6 further including means for interfacing multiple portable data carriers with the receiver transmitter by which communications of each portable data carrier and the receiver transmitter are combined with the communications of each other portable data carrier.

10. A coupler as set forth in claim 6 including means for looping back said input data (1) between said first (U4-23) and said second (U4-19) terminal means and said control means (83) comprises switching means (83) for switching data to said second terminal means (U4-19) and said input/output terminal means (J4-9).

11. A coupler as set forth in claim 10 including card connector means for receiving the portable data carrier and means for controlling said switching means for applying a bias voltage to said control means in response to insertion of said data carrier into said response to insertion of said data carrier into said connector means.

12. A coupler as set forth in claim 11 further including means for receiving data from the receiver transmitter and translating said data to the input/output terminal means adapted to be connected to said data carrier and simultaneously echoing the data received to the receiver transmitter.

13. A coupler for interfacing a portable data carrier with the receiver transmitter as set forth in claim 12, further including means for translating asynchronous data from the portable data carrier to the input/output data terminal means and means responsive to the connection of said data carrier to the input/output terminal means for generating control signals to enable translation of data from the data carrier to the host processor and data from the host processor to the data carrier and generation of a framing error signal upon detection of an error in the translated data.

14. A coupler as set forth in claim 6, wherein said control means is responsive to insertion of the data carrier into the connector means for enabling input data from the receiver transmitter to be translated to the data carrier and simultaneously looping said input data to said second terminal means to allow for detection of errors in communication.

15. A coupler as set forth in claim 14, further including a connector for receiving the data carrier and operatively connecting the data carrier to the first, the second, and the input/output terminal means for detecting the presence of a portable data carrier.

16. A coupler as set forth in claim 15, further including feedback means allowing the receiver transmitter to receive its own transmission for detecting errors in communication between the receiver transmitter and data carrier.

17. A coupler as set forth in claim 16, further including means for detecting a retransmission signal.

18. A coupler set forth in claim 16, further including means for comparing received and transmitted characters to detect multiple bit errors.

19. A coupler as set forth in claim 6 wherein said framing error signal is a single bit.

20. A coupler as set forth in claim 13, further including feedback means for echoing the data received from the receiver transmitter back to the said receiver transmitter to allow said receiver transmitter to receive its own transmission whereby a framing error is generated when a received character does not match a transmitted character exactly.

21. A coupler set forth in claim 20, further including means for detecting retransmission requests.

22. A coupler set forth in claim 21, further including means for comparing received and transmitted characters to detect multiple bit errors.

23. A coupler as set forth in claim 22, further including means for ordering a retransmission of characters transmitted by the data carrier upon detection of an error in the original transmission.

* * * * *

UNITED STATES PATENT AND TRADEMARK OFFICE
CERTIFICATE OF CORRECTION

PATENT NO. : 5,149,945
DATED : September 22, 1992
INVENTOR(S) : Johnson et al

It is certified that error appears in the above-indentified patent and that said Letters Patent is hereby corrected as shown below:

Col. 12, line 22 (Claim 1, line 13) "CD" should be --CRD--.

Col. 14, line 23 (Claim 18, line 1) "coupler set" should be --coupler as set--.

Col. 14, line 36 (Claim 21, line 1) "coupler set" should be --coupler as set--.

Col. 14, line 38 (Claim 22, line 1) "coupler set" should be --coupler as set--.

Signed and Sealed this

Thirteenth Day of September, 1994

Attest:

BRUCE LEHMAN

*Attesting Officer*    *Commissioner of Patents and Trademarks*